United States Patent [19]

Maya et al.

[11] Patent Number: 5,637,965
[45] Date of Patent: Jun. 10, 1997

[54] LOW PRESSURE SODIUM-MERCURY LAMP YIELDING SUBSTANTIALLY WHITE LIGHT

[75] Inventors: Jakob Maya, Brookline; Jagannathan Ravi, Bedford, both of Mass.

[73] Assignee: Matsushita Electric Works R&D Laboratory, Inc., Woburn, Mass.

[21] Appl. No.: 544,721

[22] Filed: Oct. 18, 1995

[51] Int. Cl.$^6$ ............................................. H01J 17/00
[52] U.S. Cl. ........................... 315/358; 315/108; 313/638
[58] Field of Search ................................. 315/326, 358, 315/246, 105, 108; 313/638, 639, 640, 641, 642

[56] References Cited

U.S. PATENT DOCUMENTS

| | | | |
|---|---|---|---|
| 4,137,484 | 1/1979 | Osteen | 315/209 R |
| 4,963,796 | 10/1990 | Gottschling et al. | 315/246 |
| 5,021,718 | 6/1991 | Maya et al. | 315/358 |
| 5,266,864 | 11/1993 | Michael et al. | 313/639 |

OTHER PUBLICATIONS

J. Maya, "*Quantum efficiency of fluorescence from the Na–Hg vapor excited by 253.7–nm radiation,*" 40(11) Appl. Phys.Lett., pp. 933–935, (1 Jun. 1982).

T.G. Verbeek, "Calculations on low pressure sodium–mercury–neon discharges, 27th Gaseous Electronics Conference", a topical conference of The American Physical Society, Division of Electron and Atomic Physicis, Sponsored by Rice University, Oct. 22–25, 1974, Houston, Texas, *Program and Abstracts*, p. 110.

*Primary Examiner*—Robert Pascal
*Assistant Examiner*—David Vu
*Attorney, Agent, or Firm*—Jerry Cohen

[57] ABSTRACT

Low pressure sodium lamp color output is shifted from yellow to a fuller spectral range of visible light (white) by effective simultaneous excitation of sodium and a mercury additive. This is made possible principally by controlling the vapor constituents and the excitation arrangement.

18 Claims, 11 Drawing Sheets

LOW PRESSURE SODIUM-MERCURY LAMP YIELDING SUBSTANTIALLY WHITE LIGHT

FIELD OF THE INVENTION

This invention relates generally to a low pressure sodium lamp where the color has been improved from an undesirable yellow monochromatic color to an acceptable white level so as to widen the field of applicability of such a lamp. It also pertains, generally, to ways of exciting a low pressure electrical discharge light source so as to change its characteristic color.

BACKGROUND OF THE INVENTION

As is well known, low pressure sodium lamps are among the most efficient light sources ever created by mankind. Efficiencies, especially at the high power levels, up to and exceeding 200 lumens per watt, have been demonstrated on commercial products. This has been the result of a lot of painstaking research and development and a lot of effort on the part of many people. Unfortunately, such a light source has a single atomic line with a yellow color, therefore it is a monochromatic radiation source. Objects under this light source look very awkward and appear as having unrealistic color. Therefore, this light source has not found a large acceptability in the marketplace. The primary application of such a light source has been in road illumination especially in Benelux countries and a few other countries around the world while the market penetration in the U.S. has been very little.

As mentioned above, for some roadway applications that might be acceptable because the color of objects is not really critical and in situations where energy savings is considered to be important such a light source has been utilized. Part of the reason for the increase in high efficiency of such a light source is the fact that the emission of sodium D lines, the principal component of the output of such a light source, falls very close to the maximum of the eye response and therefore a very small amount of radiation has a very high amount of visibility. This very same fact, however, has resulted in the light source not being acceptable for indoor general illumination applications such as offices, malls, and hotel applications.

It is an object of the present invention to provide a way of altering the color of a low pressure sodium light source so it appears white and therefore more acceptable in a variety of circumstances.

It is also an object of the present invention to provide a family of light sources of more acceptable color rendering index and high efficacy such that the field of applicability could be enhanced or widened to indoor as well as shop, factory, warehouse, motels, and high bay applications.

It is a further object of the present invention to provide an efficient white light source that has sufficient benefit to fit the applications of present day fluorescent lamps.

It is also an object of the present invention to provide a low pressure light source with a capability of compact configuration such that radiation in an acceptable white color is obtainable with high efficiency exceeding today's generally available efficiencies in compact fluorescent light sources.

Still further, it is an object of the present invention to enable a new family of light sources whereby a variety of power levels and applications could be demonstrated for general illumination.

PRIOR ART/STATE-OF-THE-ART

The prior art includes, the relevant paper, T. G. Verbeek, "Calculations On Low Pressure Sodium-Mercury Neon Discharges," Gaseous Electronics Conf. Procdgs. Houston (October 1974) Paper MB2, (copy provided with this application). Verbeek calculates the DC behavior of a low pressure sodium-mercury neon discharge. He shows that at higher currents the mercury discharge becomes more dominant near the axis of the tube while, the sodium concentration increases near the walls. However, there is no mention of the radiation due to sodium or mercury.

One of the present inventors has reported previously on the quantum efficiency of fluorescence from the sodium mercury vapor excited by 253.7 radiation. (J. Maya, "Quantum Efficiency of Fluorescence from the Na-Hg Vapor Excited by 253.7 nm Radiation," 40 Appl. Phys. Ltrs. 933 (1982) (copy provided with this application)). This is not a discharge work but it is an optical excitation study in which both sodium and mercury have been found to be excited as a result of optical radiation. In this reported work some basic energy transfer coefficients are derived that demonstrate the feasibility of high energy transfer cross section. This work does not anticipate the use of Hg/Na/rare gas in a discharge environment, such as that provided in the present invention.

There are a number of additional basic references including J. O. Phelps and C. C. Line "Electron Excitation of the Sodium Atom," Physical Rev. A, vol. 24, pg. 24, 1981; K. Otani, U.S. Pat. No. 4,870,316, "Pulsed Alkali Metal Vapor Discharge Lamp with Ceramics Outer Envelope" (Sep. 26, 1989); H. van Tongeren, "Positive Column of Cesium and Sodium-Noble Gas Discharges". Thesis, Technological University, Eindhoven, (April 1975), and Philips Res. Repts. Suppl. 1975, No. 3 (copies included with this application). These cited works discuss some basic parameters of electron excitation of the sodium upper states as well as pulsing the alkali metal vapor discharge lamp in ceramic outer envelope. The work described in the patent by K. Otani relates to a high pressure discharge not low pressure; but it is cited here to demonstrate that pulse work in high pressure has been studied. There are a variety of patents in addition to Otani's in this area. Van Tongeren discusses the positive column of sodium-noble gas low pressure discharge with the addition of cesium, but is cited to show that other additives have been tried in order to change the color of sodium low pressure discharge. This particular work has not been commercialized due to some of the disadvantages explained herein.

SUMMARY OF THE INVENTION

As is well known, a low pressure sodium lamp consists of a tube filled with a small dose of sodium metal and several Torr of neon gas through which an electrical discharge is struck. As a result of this, the characteristic Na "D" lines are emitted with very high efficiency. Since the lumen content of these lines is very high, one obtains a light source which has power-to-light intensity conversion efficiency exceeding 200 lpw (lumens per watt) especially at powers 180 watts and above. In the present invention, the color of the low pressure sodium lamp is altered in several ways. First, the additive mercury is introduced into the lamp in small doses. What happens in such a discharge, unless something special is done to the excitation mechanism, is the domination of the discharge by low pressure sodium primarily because of the much lower ionization potential of sodium atoms compared to mercury atoms. Therefore, if one wants to benefit from the added blue green color of the mercury, one would have to introduce a special excitation technique. The benefit of adding mercury is as follows: Since one is interested in altering the color to white one needs to add a few more colors to broaden the spectrum, and therefore obtain white light.

One could approach the problem either from the point of view of adding the additional blue and green lines that sodium upper states contain, which implies exciting the upper excited states of sodium by a special mechanism, or having an additive that might contribute the needed blue, green, and red lines. Having investigated both approaches the latter has been found to be much more effective than the former. Inasmuch as it was possible to excite, only with sodium, the upper excited states a little bit, it was not sufficient to change the color of the LPS lamp. On the other hand, adding mercury presents a different set of problems, i.e. how to make sure that the discharge is not controlled by sodium and one obtains reasonable contribution from mercury as well as sodium. Examination of a whole variety of compositions and temperatures yields a set of conditions whereby both sodium and mercury are excitable.

Thus, a second approach to color alteration, supplementing the first approach (mercury addition), is needed to assure that the excitation of sodium and mercury takes place simultaneously. This can be done by establishing a high energy electron density and/or by somewhat altering the electron energy distribution function (EEDF) such that the mercury, which has much higher excitation levels and much higher ionization potentials, is still excitable alongside with sodium. That was accomplished by a special pulsing technique and by carefully choosing the Na/Hg composition which is described below in somewhat more detail. Basically, the excitation of sodium and mercury simultaneously is the key to enable one to obtain the white color low pressure discharge. In this approach, there is a narrow range of compositions and temperatures whereby this is achievable. The special pulsing technique accomplishes several things. One is to make sure that the discharge is not primarily dominated by sodium (and therefore ends up in a pure yellow color). Further, it is useful to alter the EEDF so that there are some high energy electrons that can excite mercury and finally to deliver a substantial amount of power into the discharge in such a manner that one can obtain a discharge in practical lamp power levels.

The sodium-mercury lamp described of this invention can be distinguished from a commercially available class of lamps called high pressure sodium (HPS) lamps. HPS lamps also contain mercury. These HPS lamps operate at such high temperature (cold spot temperature of about 1000° K.) that sodium and mercury vapor pressures are about 100 and 1000 Torr, respectively. Further, the buffer gas (usually xenon), is also at a relatively high pressure (100–1000 Torr). Under these conditions, all the vapor species are in near equilibrium with each other at an axis temperature of nearly 4000° K. reducing to about 1500° K. at the walls. The spectrum is dominated by the pressure broadened sodium D-lines enhanced by mercury and xenon.

In the lamp of the present invention, the vapor pressure is low (less than about 30 Torr, for sodium and mercury and less than about 30 Torr for the buffer gas) and hence it is difficult to excite the mercury atoms to the required higher energy levels. Special steps have to be taken to ensure that the mercury is also excited sufficiently and thus prevent the discharge from being preferentially dominated by sodium.

The system of the present invention is and has been shown to be highly reproducible and it has been tried with a variety of rare gas pressures and shown to be independent of rare gas, as well as being independent of the particular diameters or lengths of lamps. It has been quite reproducible under the composition and temperature conditions.

In the detailed description of the preferred embodiment, the particular details and dimensions as well as the waveforms and excitation schemes will be demonstrated. Other objects, features and advantages will be apparent from the following detailed description of preferred embodiments taken in conjunction with the accompanying drawings in which:

BRIEF DESCRIPTION OF THE DRAWINGS

FIG. 7 is a waveform of excitation intensity vs. wavelength

DETAILED DESCRIPTION OF PREFERRED EMBODIMENTS

The first approach taken to add a few more colors to low pressure sodium discharge was to apply voltage pulses to a commercial LPS lamp.

The upper energy states from which the blue, green and red atomic lines originate could not be populated sufficiently to alter the overall color.

Figure 1:
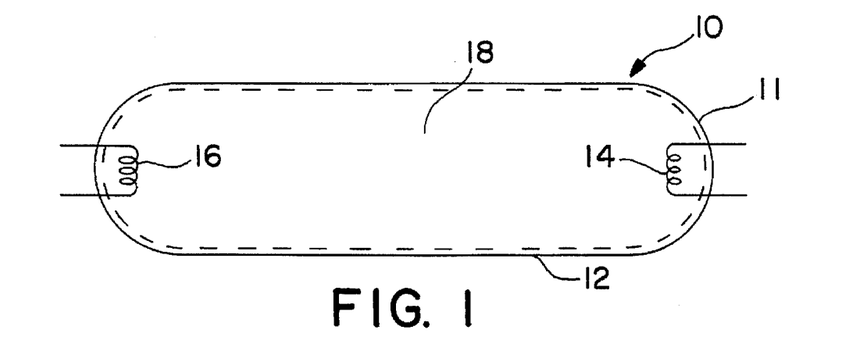
FIG. 1 shows the basic arrangement of a lamp containing Na, Hg and a rare gas.
Figure 1A:
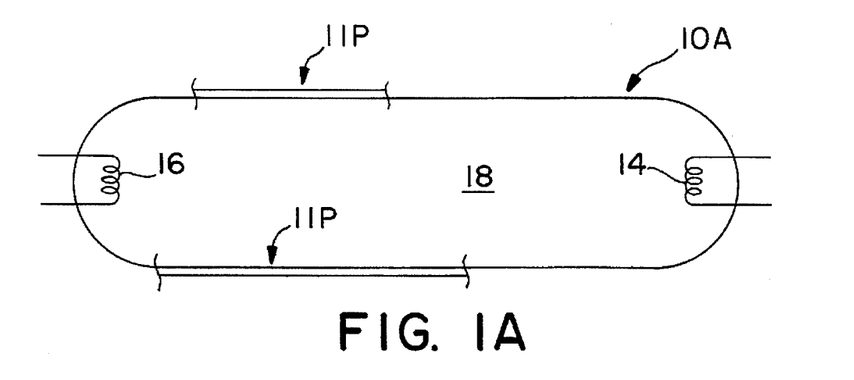
FIGS. 1A and 1B show variants of the FIG. 1 component.
Figure 1B:
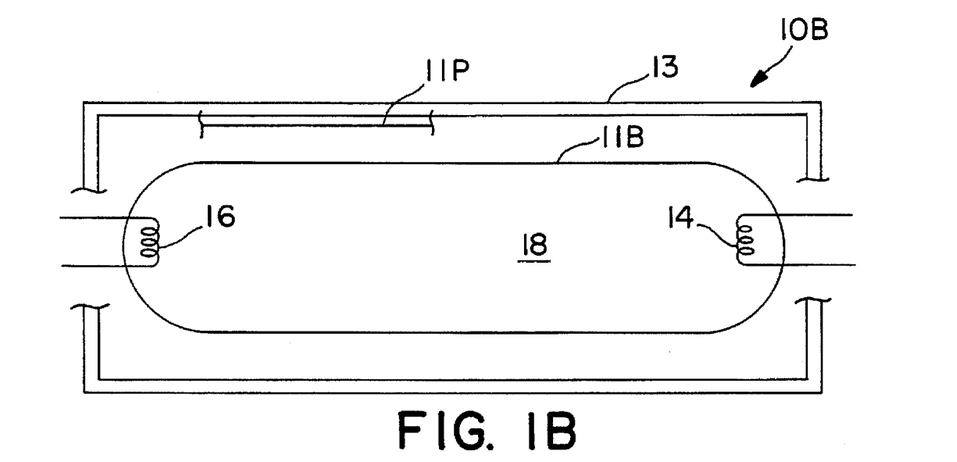
Figure 2A:
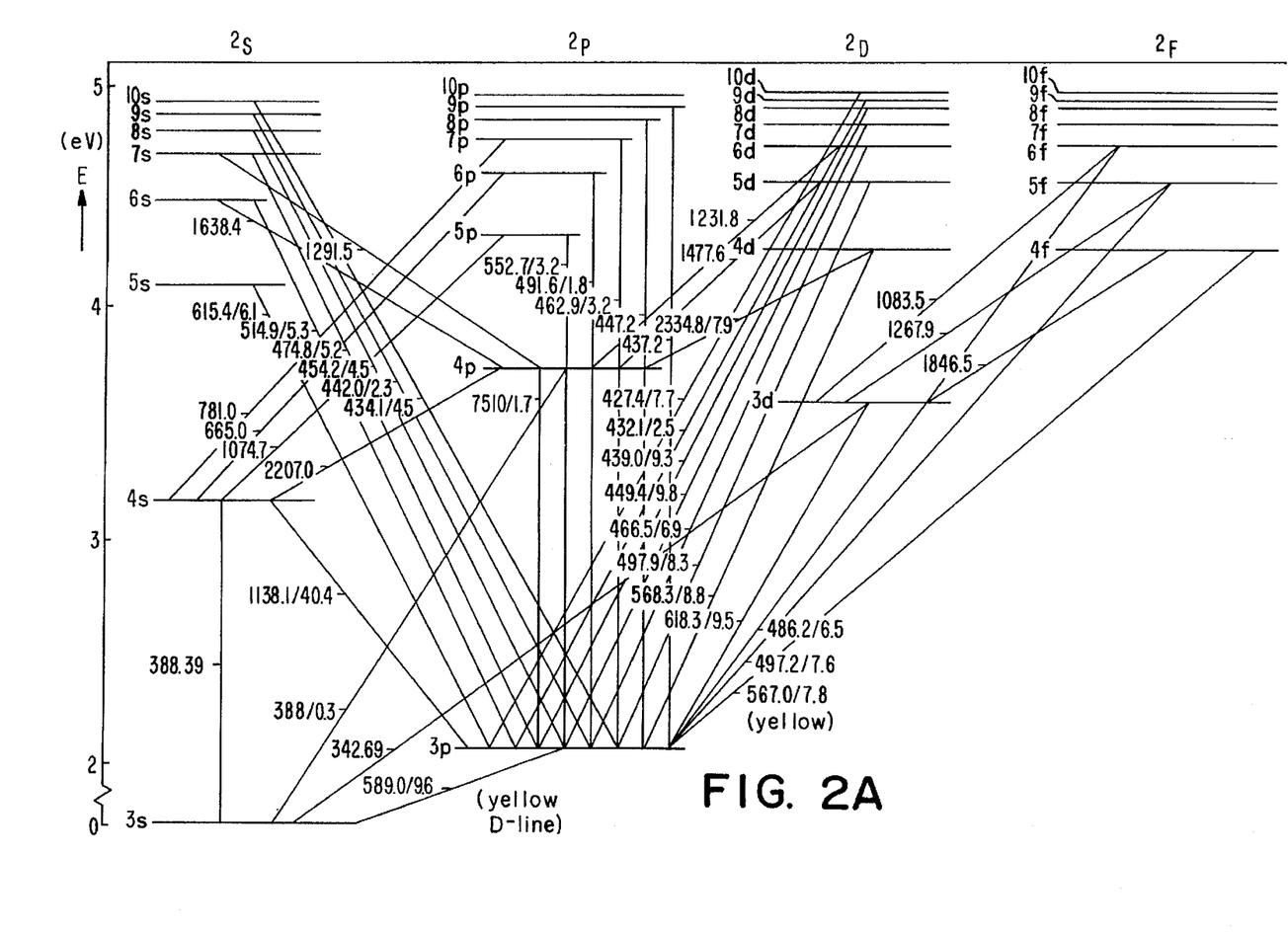
FIGS. 2a and 2b are energy-level diagrams, showing the energy levels of Na and Hg and the atomic transitions and next to the wavelengths are shown the colors of the important transitions.
Figure 2B:
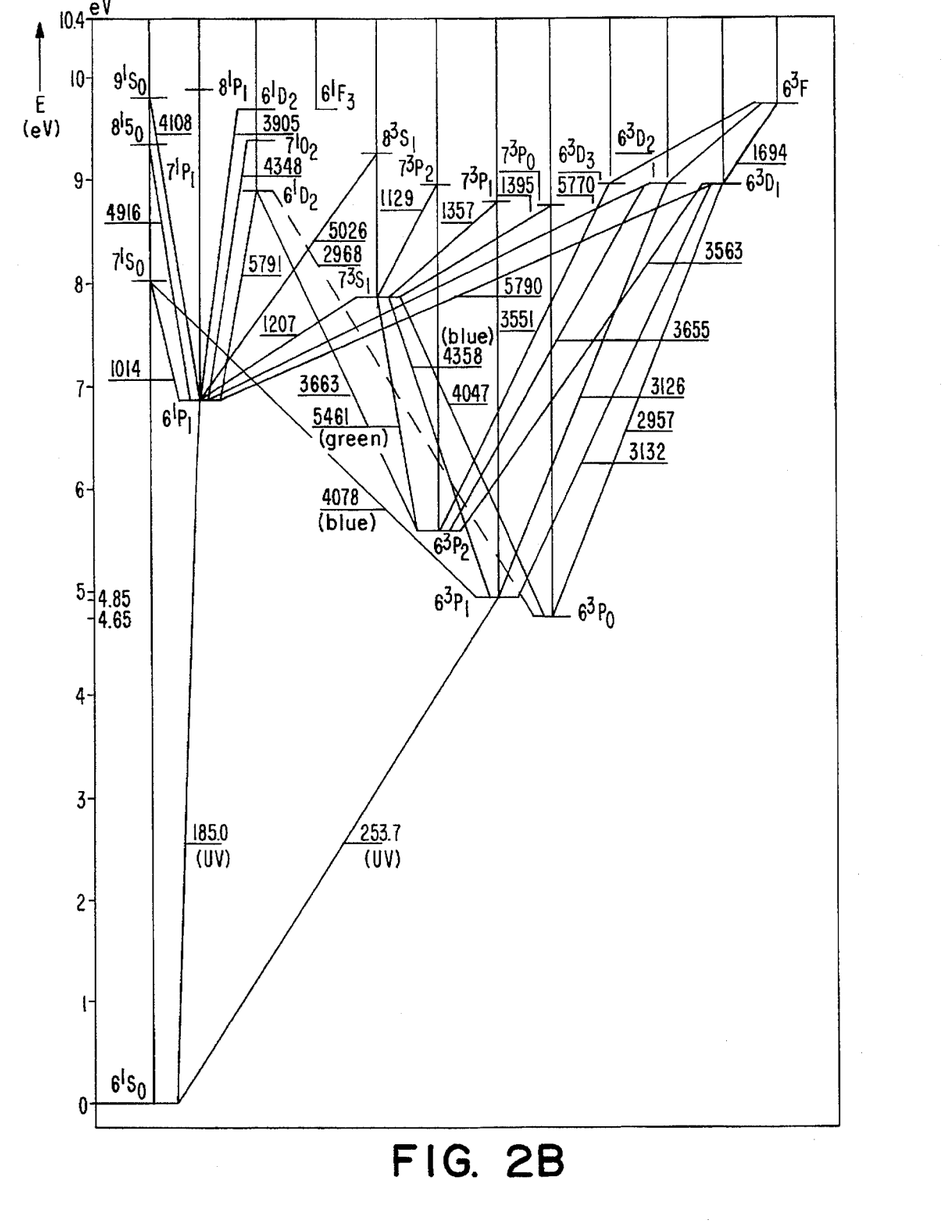
Figure 3:
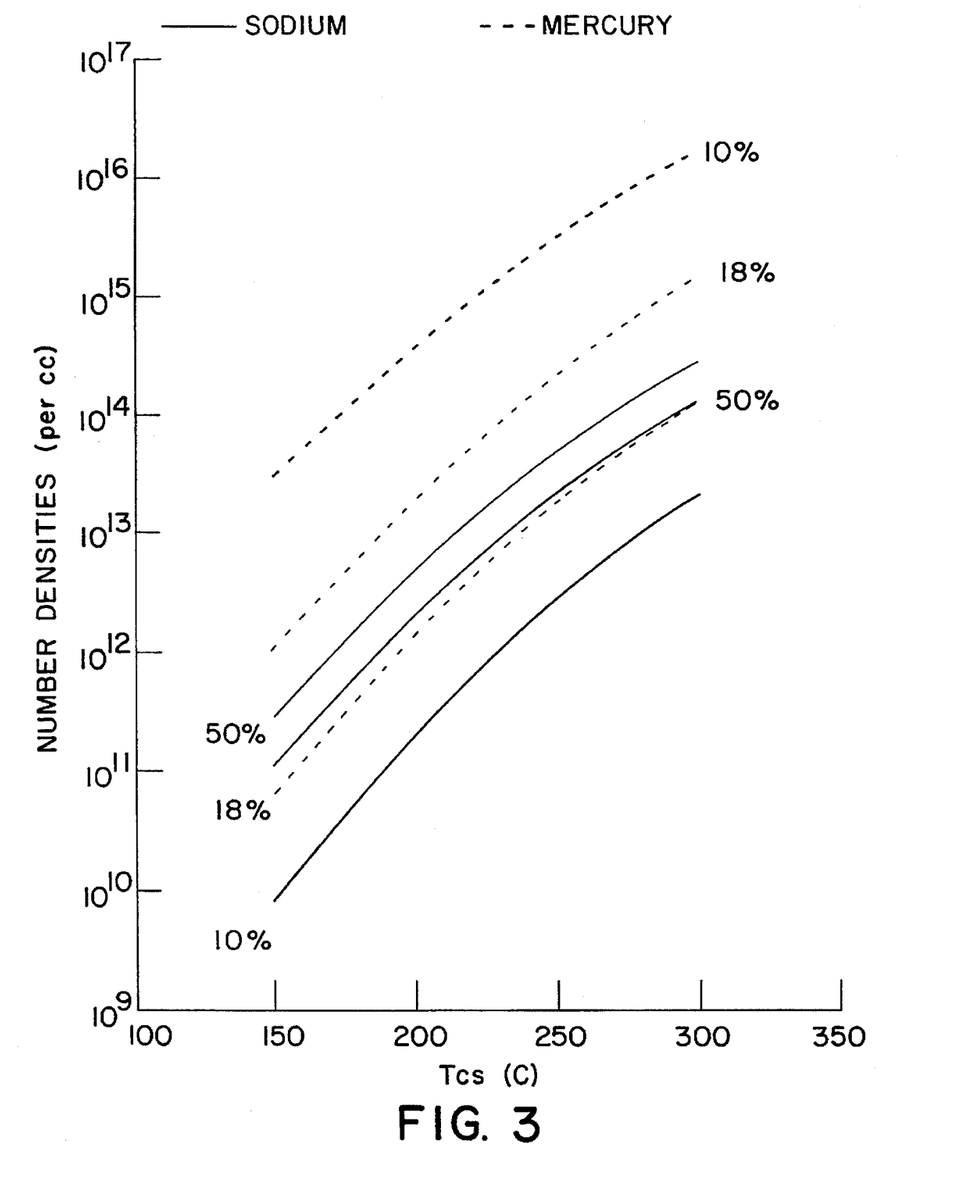
FIG. 3 is a density-temperature plot that shows the number densities of Na and Hg as a function of temperature of the amalgam for different Na weight percentages in the amalgam.

Subsequently, lamps were made containing equal amounts of sodium and mercury by weight. FIG. 1 shows one of several lamps made pursuant to a first preferred embodiment of the invention for the testing and modification described below. The lamp 10 has a closed-end elongated arc tube 12 made of glass, electrodes 14/16 and a low pressure of discharge sustaining gas. The arc tubes for these lamps were made of 2 ply glass (soda lime coated with a sodium resistant borate lining) of diameter 15 mm and electrode-electrode distance of about 175 mm. FIGS. 2A and 3b show respectively, energy-level diagrams of sodium and mercury atoms (Reference for FIG. 2A: *The High-Pressure Sodium Lamp*, J. de Groot, J. Van Vliet, Kluwer Technische Boeken, Publisher, 1986 Reference for FIG. 2b: *Low Pressure Discharges*, W. Elenbaas, Philips Technical Library. Reference for FIG. 3: *Calculations based on formulas*, from P. A. Reiser & E. F. Wyner, J. Appl.Phy. V. 57, p. 1625, 1985)).

The sodium-mercury proportion was chosen to give roughly equal amounts of sodium and mercury in the vapor state over the temperature range of interest. FIG. 3 shows the number densities of sodium and mercury at different cold spot temperatures ($T_{cs}$) with different curves for different proportions of sodium and mercury in the original amalgam. The numbers adjacent to the curves give the percentage by weight of sodium in the amalgam. Note particularly the curves corresponding to 50% Na in the amalgam. The amalgams used in the lamps were 40% and 50% sodium by weight. Over a wide range of cold spot temperatures, different drive schemes, including CW, pulse train or pulse burst, failed to change the light output of the lamp from the original yellow emission from sodium. It appears that the sodium resonant state (D-lines) was preferentially excited and to a much lower extent, one upper state line (568 nm). The other sodium lines and the mercury visible lines were not evident at all (see FIGS. 2a and 2b).

Figure 4:
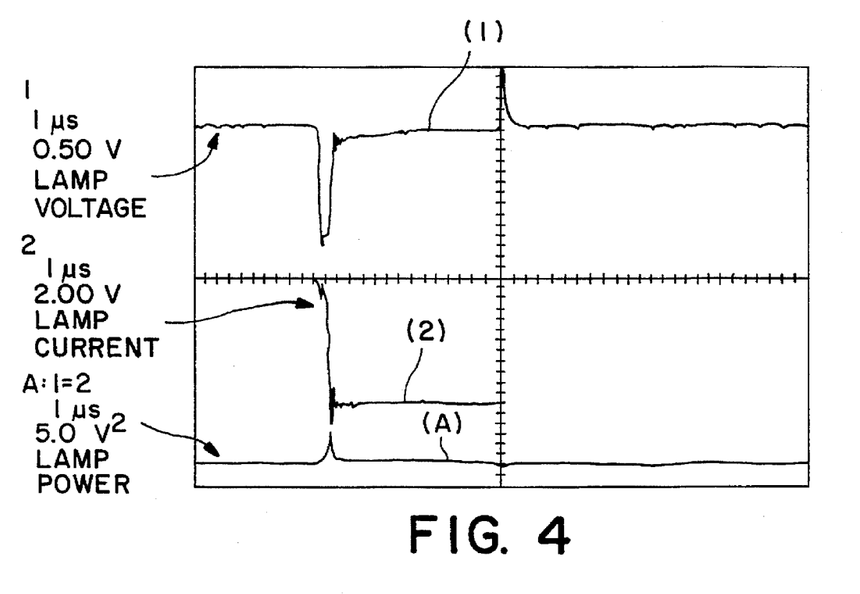
FIG. 4 is a trio of oscilloscope traces showing the shapes of a single pulse of voltage, current and power, about 3μ sec wide, in a pulse train of 2.3 kHz.

In order to increase the mercury concentration in the vapor state, lamps containing amalgams with a lower percentage of sodium were tested. The arc tubes (12) in these experiments were made of polycrystalline alumina (PCA) with a filling of sodium, mercury and rare gas (xenon). The PCA arc tube had physical dimensions of about 5 mm ID and electrode distance of 27 mm. It had an amalgam of 15–20% sodium by weight and buffer gas of xenon of about 20 Torr. The cold spot temperature was varied in discrete steps from about 65° C. to 320° C. The lamp was driven by a rectangular pulse train (FIG. 4) of 2.3 kHz and pulse widths of 1, 3 or 5 μs (corresponding to a duty cycle of 0.23, 0.69 and 1.15%). It was found that the cold spot temperature had a large effect on the spectrum. The discharge spectrum changed continuously: from that of xenon at the lowest cold spot temperature (about 65° C.) to xenon-mercury to mercury and sodium D line to mercury and sodium lines to only sodium lines (D-line and 568 nm being most prominent) and finally to an HPS type arc at the highest temperature (317° C.). The pulse width mainly changed the intensities of the lines present.

Figure 5:
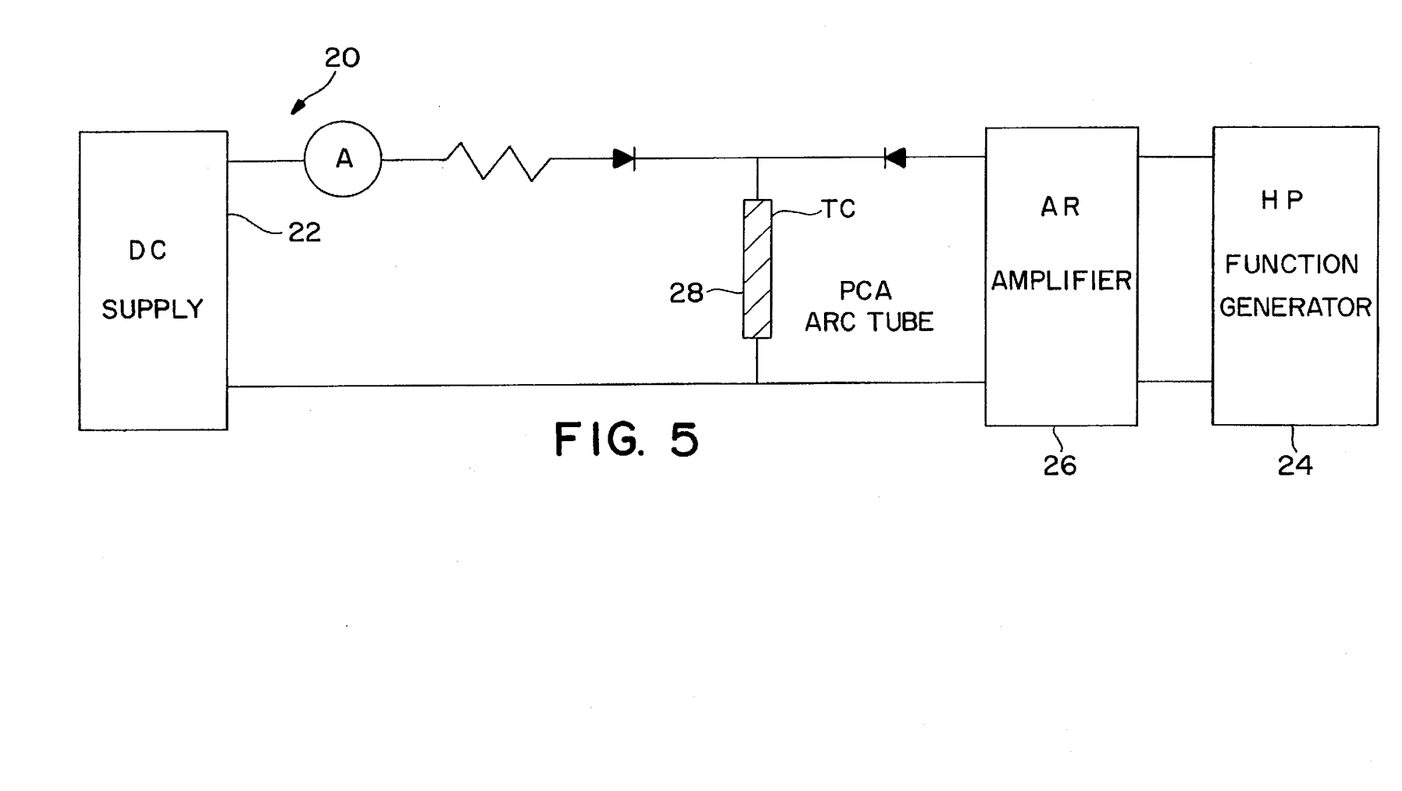
FIG. 5 is an electrical schematic that shows a typical driving circuit arrangement where a pulsing scheme can be superimposed on top of a DC, which can be employed (together with physical characteristics and structure shown in FIGS. 1–3) in preferred embodiments of the present invention.
Figure 6A:
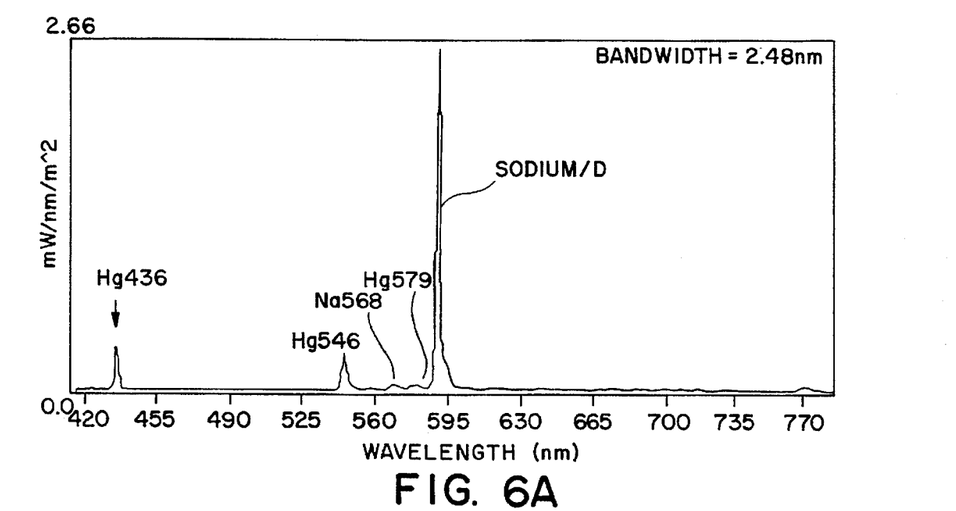
FIG. 6a is power density trace (vs. wavelength) presented as a typical example of a white spectrum at a cold spot of 192° C. when excited by a pulse train shown in FIG. 6b. (Note that the Na "D" lines are still fairly strong compared to the mercury lines) and FIGS. 7a and 7b similarly show that for the same lamp at a cold spot temperature of 220° C. the color was yellow rather than white.
Figure 7A:
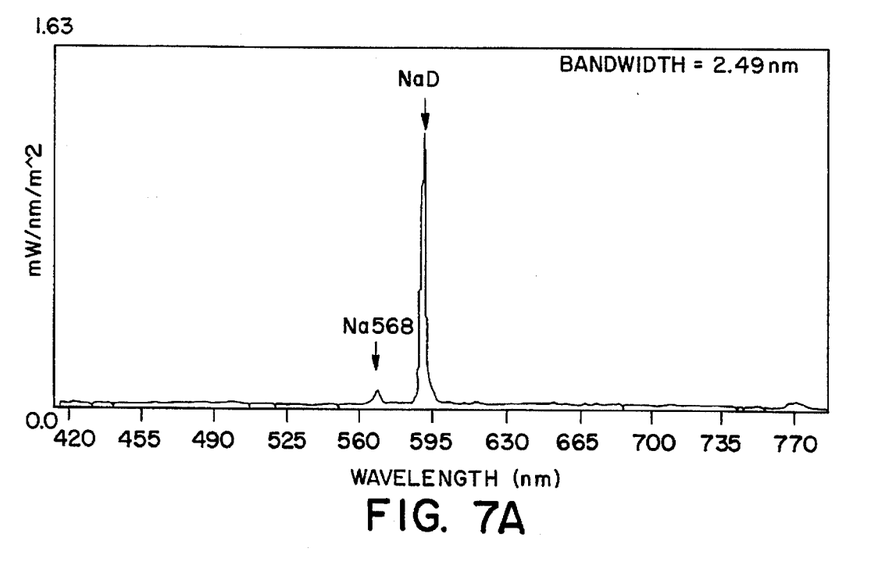

In another experiment, a different drive approach was used as shown in FIG. 5, i.e. a drive circuit 20 with a DC supply 22, function generator 24, amplifier 26 and arc tube 28 with conventional additional blocking and measuring components. A low level simmer current (D.C. about 10 mA) was applied from the DC supply to maintain a sodium discharge and a pulse burst was superimposed on it from the function generator and amplifier. It was found that over a narrow cold spot temperature range, the discharge color could be changed from yellow to white on application of the pulse burst. The change in color is due to the presence of mercury blue and green lines. While the color change was clearly visible at 192° C. (FIG. 6a), the mercury lines could not be excited at 220° C. (FIG. 7a) and the lamp remained stubbornly yellow.

Figure 6B:
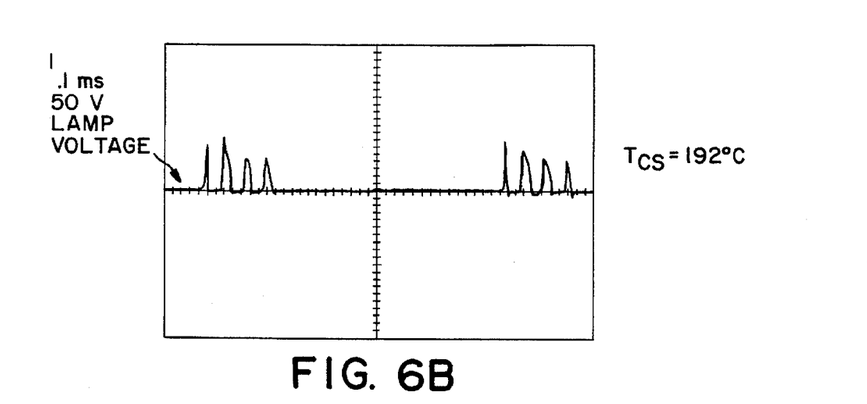
Figure 7B:
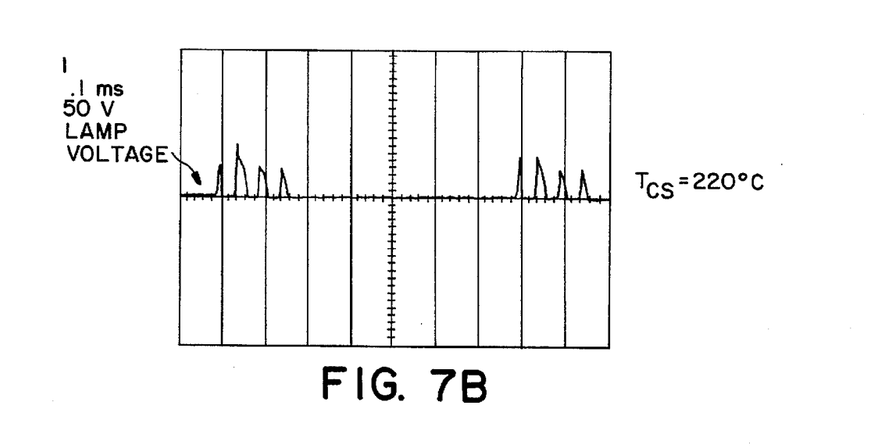

The output of the amplifier was a burst of sinusoidal pulses of frequency 20 kHz and burst duty cycle about 20%. The waveform is then rectified by the diode and further altered by the discharge. FIGS. 6b and 7b show the resultant lamp voltages.

Figure 8A:
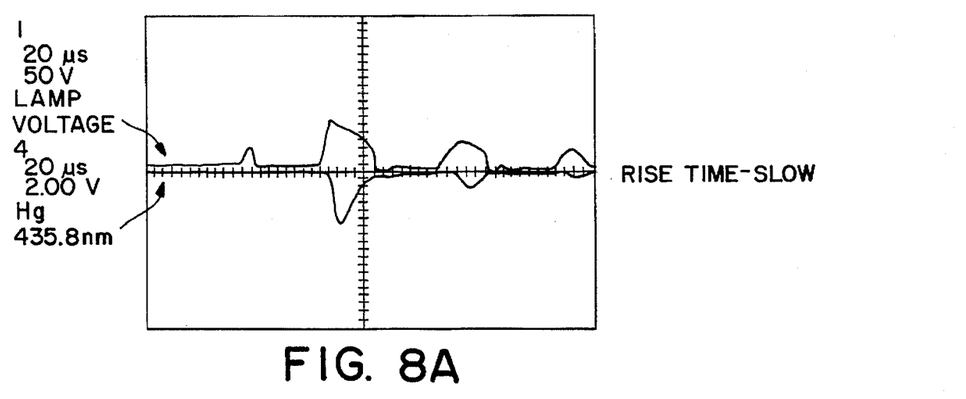
FIGS. 8a, 8b, 8c show the slow (a), nominal (b) and fast (c) rise time waveforms that are instrumental in exciting the mercury lines even on the first pulse.
Figure 8B:
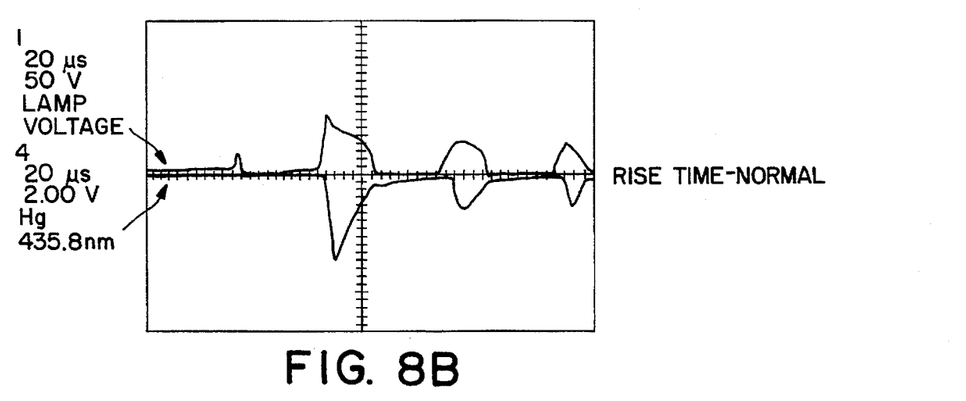
Figure 8C:
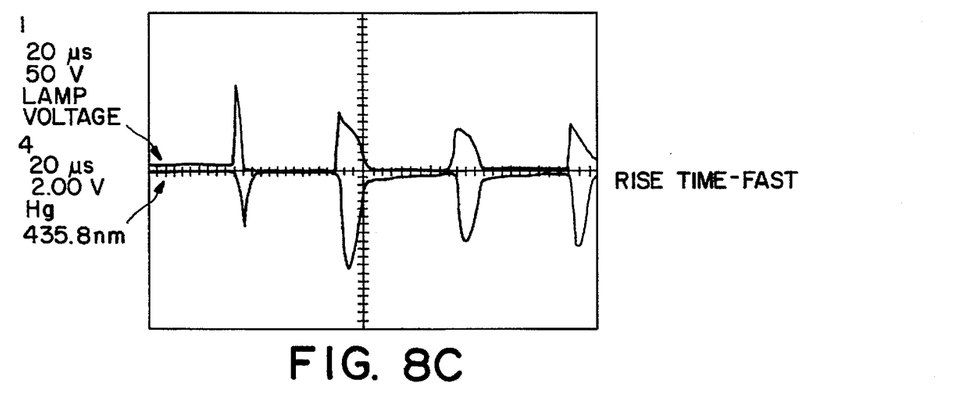

It was also observed, through time-resolved spectral measurements, that the mercury lines were not present during the first pulse of the burst. However, by altering the waveshape such that the pulses had a faster rise time, mercury lines could be made to appear even on the first pulse. FIGS. 8a–8c show the lamp voltage waveforms corresponding to a slow, nominal and fast rise time triangular pulses. Also shown as negative pulses are the time-resolved signals of the mercury 435 line captured by a monochromator. There are no mercury pulses in the first two figures (8a and 8b). But a fast rising waveform causes the mercury 435 line to be present even on the first peak. The reason for this phenomenon is the higher electric field that is instantly applied across the discharge and this is evidenced by the higher voltage peaks in the lamp voltage waveform at the leading edge of all pulses but especially on the first pulse.

The electric field in the positive column was measured and found to be about 2.5 V/cm on the first peak of the pulse burst. Thus the color change from yellow to white as a result of mercury visible lines excitation may be attributed to the increased electric field and a relatively low level of sodium in the vapor (controlled by the cold spot temperature and amalgam composition)

Similar results were also obtained with another PCA arc tube (about 7.5 mm ID, electrode distance about 210 mm, about 15–20% Na amalgam, about 10 Torr Xe).

Figure 9A:
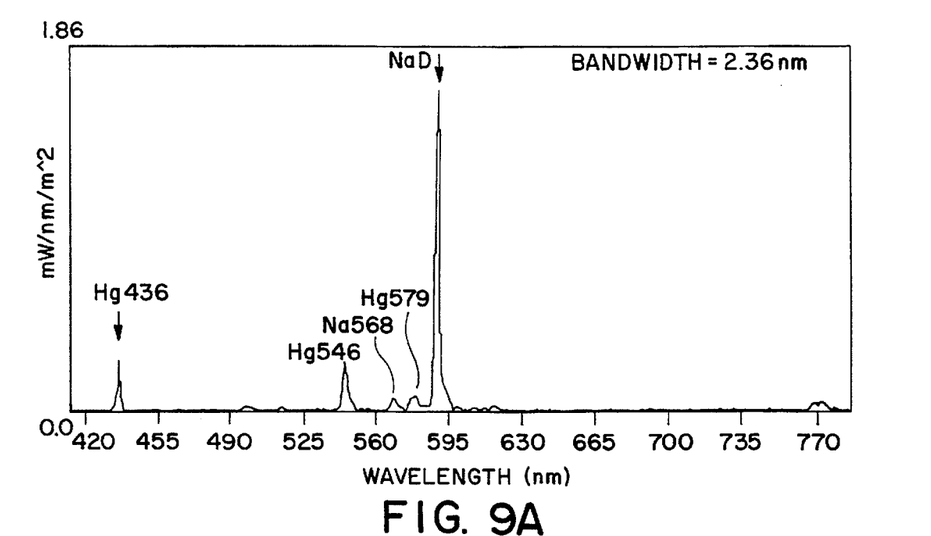
FIGS. 9a and 9b (in format similar to FIGS. 6a, 6b) show a white LPSM lamp at a cold spot temperature of 243° C., achieved without simmer current and with a sinusoidal pulse burst drive and FIGS. 10a and 10b (similar format) show the spectrum at 209° C. where color temperature was increased substantially due to stronger mercury line emission as well as Na "D" lines, in practice of a preferred embodiment of the present invention (as is also indicated in FIGS. 1–8b).
Figure 9B:
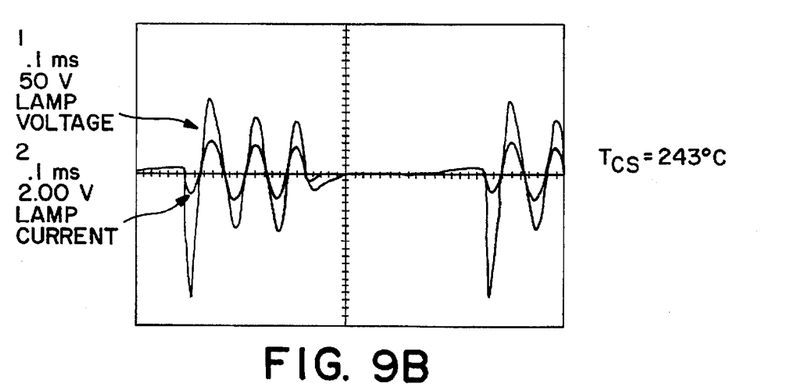
Figure 10A:
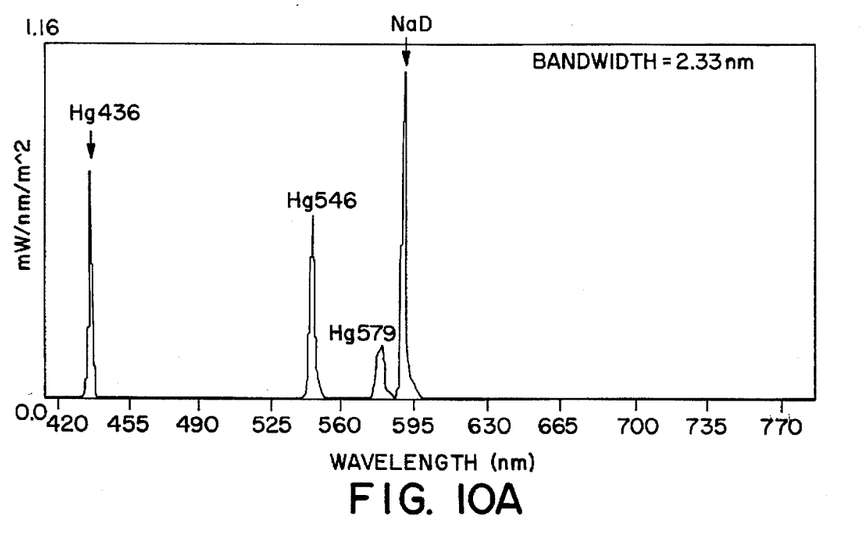
Figure 10B:
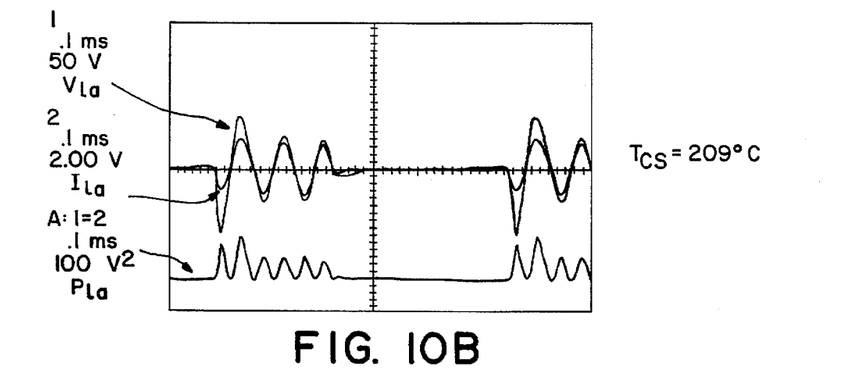
FIG. 10B is a cold spot temperature trace vs. time, both illustrating further experimental results demonstrative of the invention's benefits.

The lamp tests thus far had shown better results from having less sodium in the amalgam and by pulse excitation. A new lamp arc tube was constructed out of 2 ply glass (soda lime with sodium resistant borate lining) of dimensions 15 mm ID and inter electrode distance of about 175 mm. The arc tube contained 10% Na amalgam and a buffer gas, xenon, of 3 Torr. The lamp could be operated without a simmer current. Using a sinusoidal pulse burst drive (duty cycle about 40%, frequency 10 kHz), the lamp had a whitish color at a cold spot temperature of 243° C. (FIGS. 9a and 9b). When the cold spot temperature was lowered to 209° C. (FIGS. 10a and 10b) the color temperature went up due to the increase in the mercury line heights with respect to the sodium D-line. It was found that lowering the cold spot temperature to about 200° C. and below, a CW excitation was sufficient to excite both sodium and mercury and thus a white color. Driving the lamp with pulse burst instead of CW caused the color temperature to go up, i.e., turning the lamp more "white". Some measurements are given in Table I below (all taken at lamp power of 12.5 W and frequency of 50 kHz).

TABLE

| Cold Spot Temperature | Drive | Color Temperature |
| --- | --- | --- |
| 163° C. | Sinusoidal CW | 2566°K |
| 163° C. | Sinusoidal burst (40% duty cycle) | 3012°K |
| 206° C. | Sinusoidal CW | 2305°K |
| 206° C. | Sinusoidal pulse burst (40% duty cycle) | 2541°K |

The table also shows the trend towards sodium dominance and the reduced effectiveness of pulse burst drive at higher cold spot temperatures. The lower sodium composition increases the cold spot temperature range over which a white color spectrum is possible.

The lamp described above is a preferred embodiment of a white color, low pressure, sodium-mercury lamp. There are many feasible variations within the scope of the present invention. For example, the buffer gas may be changed to a different rare gas or combinations such as neon or argon without substantially affecting the spectrum due to sodium and mercury. For convenience the term "rare gas" is used herein to include argon as well as conventional rare gasses e.g. helium, neon, krypton, xenon.

The foregoing results also indicate that a lower sodium composition (e.g., down to 2–3%) in the amalgam is not only feasible but desirable, since the temperature needed to excite mercury and sodium simultaneously will be reduced and the need for a pulse burst driving waveform is diminished; even a CW drive such as from a commercial electronic high frequency ballast may be sufficient to generate white color from the lamp.

Further improvements in the lamp performance may be obtained by utilizing the mercury ultraviolet radiation, in particular the 254 nm resonance line. The presence of mercury visible lines means a large amount of UV is also being generated in the arc tube which may be converted to visible light through the use of phosphor. For this purpose, the arc tube will need to be made of quartz or PCA which substantially transmit the 254 nm UV radiation. The phosphor coating may be applied on the inner wall of the glass jacket enclosing the arc tube or may even be on the outside surface of the arc tube. The phosphor conversion will not only increase the lamp luminous efficacy but will also provide a means to alter the color temperature and color rendering index by the right choice of phosphor. Appropriate phosphor types for such purpose include, but are not limited to, the following: $Y_2O_3$:Eu, $(SrCaBa)_5 (PO_4)_3$ Cl:Eu, $LaPO_4$:Ce,Tb. This concept has not been shown in any commercial lamp containing only sodium or sodium and mercury.

The lamp embodiments described in this invention show the use of voltage pulses to create an electric field that is high enough to excite sodium and mercury upper energy states in a low pressure plasma. High pressure discharge lamps, on the other hand, are current driven and excitation of the upper states is typically achieved with high current pulses.

The rise time of the driving voltage waveform, especially under pulse or pulse burst conditions, gives another method of control to alter the color temperature. It has been shown that a faster rise time (about one microsecond) increased the occurence of the mercury lines. Using this concept, other wave shapes may be constructed that are even more efficient in exciting the upper states of mercury and sodium and these are also within the scope of this invention.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

We claim:

1. A low-pressure sodium lamp comprising:

(1) arc-containing enclosure means;

(2) sodium metal, mercury metal, and a rare gas within the enclosure, the sodium composition in the amalgam comprising at most 20 percent by weight with the rare gas pressure from 0.1 to 30 Torr, and (3) means for exciting the mixture in a manner to produce an arc with a cold spot temperature from about 100° C. to about 400° C. and with excitation of the resonant and upper states of Na and Hg in the arc, whereby a substantially white color output is obtainable from the lamp;

and wherein said means for excitation are selected from the group of excitation means consisting of (a) alternating current (CW); (b) pulse train of any waveshape with rise times in the range of $10^{-8}$ to $10^{-5}$ microseconds; (c) pulse burst of duty cycle greater than 5%; (d) direct current; (e) combination of the foregoing; and (f) individual ones or combinations of the foregoing controlled to maintain a minimal discharge (simmer) normally which can be raised to an operational illuminating state;

and further comprising means for changing the color temperature of the lamp by varying one or both of excitation waveform and cold spot temperatures thereof.

2. A lamp in accordance with claim 1, wherein the arc-containing enclosure comprises at least a wall portion which is substantially transparent to radiation at about the spectral locations of the mercury ultra violet lines.

3. The lamp of claim 2 wherein the said wall portion is made from a material selected from the class consisting of quartz and alumina and further comprises a phosphor layer thereon.

4. The lamp of claim 3 wherein the phosphor is a coating on the outside surface of said wall portion.

5. The lamp of claim 3 wherein the arc-containing enclosure is aligned with a transparent outer wall that is also in the path of radiation transmission from the enclosure to outside and the outer wall has a phosphor coating on one of its faces.

6. A sodium lamp with controlled or controllable emission of light of a spectral output including white, with a color temperature in the range of 2,000° to 6,000° K., comprising:

(a) means defining an arc region of low pressure rare gas (30 Torr or less) with a source of vaporizable sodium and mercury material therein, (b) means for striking and maintaining an arc discharge of a gas mixture of vaporized sodium and mercury and of the rare gas in the arc region, the foregoing sodium-mercury composition and the excitation means constructed and arranged to cause both sodium and mercury atoms to give off radiation by resonant and upper states excitation, the electron energy distribution function of the arc discharge being such that such higher level excitation is substantial while maintaining a cold spot temperature in the arc discharge region in a range of from 100° to 400° C. thus limiting sodium vapor generation in relation to mercury vapor generation.

7. The lamp of claim 6 wherein said means (a) and (b) are constructed and arranged to produce the cold spot temperature of 100°–250° C. in the arc and a CW excitation is applied.

8. The lamp of either of claims 6 or 7 and further comprising means to capture ultraviolet light emission from the arc discharge and convert it to visible light range emission.

9. Method of generating a composite visible light range radiation in the color temperature range from 2,000° to 6,000° K. by establishing a vapor mixture of gasses including two gasses that are excitable in a low pressure arc to states of energy emission at wavelengths that are spread apart, but which average to an apparent color emission known as white light and establishing and maintaining such an arc discharge therein with a cold spot temperature of 100° to 400° C. and with an electron energy distribution function such that those excited states are realized.

10. Method of claim 9 wherein the excitable gasses are sodium and mercury and the gas mixture also includes a low pressure rare gas not substantially excited to light discharge under said conditions.

11. Method in accordance with claim 10 wherein the sodium and mercury are provided as solids in a low pressure rare gas in an arc region and vaporized by arc establishment of an arc discharge in that region.

12. Method in accordance with claim 11 wherein the arc is excited by applying a pulsating voltage with sufficiently fast pulse rise times to enhance generation of emission of the mercury spectral lines.

13. Method in accordance with any of claims 9–12 and further comprising capture of at least a portion of UV emission from said arc region and conversion thereof, at least in part, to visible radiation by the use of appropriate phosphors.

14. Method in accordance with any of claims 9–12 wherein the non-yellow portion of the composite output of the light source comprises at least in part the radiation output from excitation of sodium to higher levels than those associated with characteristic monochromatic yellow emission whereby the sodium itself contributes a non-yellow as well as yellow output.

15. Method in accordance with any of claims 9–12 wherein the non-yellow portion of the composite output of the light source comprises, at least in part, radiation in the visible spectrum from excitation of mercury.

16. Method in accordance with any of claims 9–12 wherein the nonyellow portion of the composite output of the light source comprises, at least in part, light from the conversion of ultraviolet radiation from the mercury resonant energy states.

17. Method in accordance with any of claims 9–12 wherein the non-yellow portion of the composite output of the light source comprises at least in part a combination of excitation of mercury to higher energy states and excitation of sodium to higher levels than those associated with characteristic monochromatic yellow emission whereby the sodium itself contributes a non-yellow as well as yellow output and emission from a phosphor converting ultraviolet mercury radiation.

18. Method in accordance with claim 17 wherein mercury and sodium metals are vaporized in a low pressure rare gas environment in an arc region and provided in quantitative vapor amounts so that non-yellow emission from the mercury is sufficient quantitively to counterbalance sodium yellow emission.

* * * * *